(12) United States Patent
Yu et al.

(10) Patent No.: US 12,316,130 B2
(45) Date of Patent: May 27, 2025

(54) WIRELESS CHARGING APPARATUS

(71) Applicant: NINGBO WEIE ELECTRONICS TECHNOLOGY LTD., Ningbo (CN)

(72) Inventors: Feng Yu, Ningbo (CN); Lizhi Xu, Ningbo (CN); Weiyi Feng, Ningbo (CN)

(73) Assignee: NINGBO WEIE ELECTRONICS TECHNOLOGY LTD., Ningbo (CN)

( * ) Notice: Subject to any disclaimer, the term of this patent is extended or adjusted under 35 U.S.C. 154(b) by 941 days.

(21) Appl. No.: 17/461,097

(22) Filed: Aug. 30, 2021

(65) Prior Publication Data
US 2022/0069623 A1 Mar. 3, 2022

(30) Foreign Application Priority Data
Aug. 31, 2020 (CN) .......................... 202010898193.2

(51) Int. Cl.
*H02J 50/10* (2016.01)
*H01F 27/22* (2006.01)
*H01F 27/245* (2006.01)
*H02J 50/00* (2016.01)

(52) U.S. Cl.
CPC .............. *H02J 50/10* (2016.02); *H01F 27/22* (2013.01); *H01F 27/245* (2013.01); *H02J 50/005* (2020.01)

(58) Field of Classification Search
CPC ......... H02J 50/10; H02J 50/005; H01F 27/22; H01F 27/025
USPC ................................. 320/104, 108; 307/104
See application file for complete search history.

(56) References Cited

U.S. PATENT DOCUMENTS

| | | | | |
|---|---|---|---|---|
| 2010/0007215 A1* | 1/2010 | Sakuma | ................ | H01F 27/366 335/297 |
| 2015/0097521 A1* | 4/2015 | Endou | ..................... | H01F 38/14 320/108 |
| 2020/0051736 A1* | 2/2020 | Yu | .......................... | H01F 27/324 |
| 2020/0168390 A1* | 5/2020 | Suzuki | .................... | H01F 17/06 |

FOREIGN PATENT DOCUMENTS

| | | |
|---|---|---|
| CN | 104600782 A | 5/2015 |
| CN | 207977786 U | 10/2018 |
| CN | 109586365 A | 4/2019 |
| CN | 208874364 U | 5/2019 |
| CN | 106911193 B | 6/2020 |
| CN | 212380997 U | 1/2021 |

OTHER PUBLICATIONS

First Office Action for Chinese Patent Application No. 202010898193. 2, issued Nov. 14, 2024.

* cited by examiner

*Primary Examiner* — Richard V Muralidar
(74) *Attorney, Agent, or Firm* — Andrus Intellectual Property Law, LLP

(57) ABSTRACT

A wireless charging apparatus is disclosed. The wireless charging apparatus comprises a transmitting coil assembly, a heat conduction stand, and a heat conduction housing; wherein the transmitting coil assembly comprises a magnetic sheet and a transmitting coil, wherein the transmitting coil is put on the magnetic sheet. The heat generated by the transmitting coil assembly during charging can be transferred to the heat conduction stand and then further to the heat conduction housing to dissipate heat, so as to reduce the temperature of the wireless charging apparatus.

17 Claims, 3 Drawing Sheets

WIRELESS CHARGING APPARATUS

CLAIM OF PRIORITY AND CROSS-REFERENCE TO RELATED APPLICATION(S)

This application claims the benefit of Chinese Patent Application No. 202010898193.2, filed on Aug. 31, 2020, which is incorporated herein by reference in its entirety.

BACKGROUND OF THE INVENTION

1. Field of the Invention

The present disclosure relates to the field of wireless charging, and particularly to a wireless charging apparatus.

2. Description of the Related Art

With the popularization of wireless charging mobile phones, a user has higher and higher requirements for charging speed and degree of charging freedom, and a wireless charger needs a greater transmission power. Therefore, the heat of a high-power wireless charger, especially the heat of a power transmitting coil and a magnetic sheet, has become a problem urgent to solve. At present, there is a heat dissipation mode is heat conduction, that is, the temperature of the wireless charger is reduced by means of attaching the power transmitting coil and a power circuit to a heat conduction housing. However, in the heat dissipation mode, when the magnetic flux of enhanced magnetic field of transmitting coil forms a closed loop at an edge of the magnetic sheet, the heat conduction housing would generate extra eddy current loss. Therefore, the charging efficiency is reduced, and extra heat is generated.

BRIEF DESCRIPTION OF THE INVENTION

In view of this, the present disclosure provides a wireless charging apparatus.

According to one aspect of the present disclosure, there is provided a wireless charging apparatus comprises a transmitting coil assembly, a heat conduction stand, and a heat conduction housing; wherein the transmitting coil assembly comprises a magnetic sheet and a transmitting coil, wherein the transmitting coil is put on the magnetic sheet; the heat conduction stand is configured to place the transmitting coil assembly, the heat conduction stand being thermally conductively connected to the magnetic sheet and having an overlapping area with the magnetic sheet less than an area of the magnetic sheet; the heat conduction housing is connected to the heat conduction stand, and being configured to receive, through the heat conduction stand, heat generated by the transmitting coil.

In accordance with the abovementioned wireless charging apparatus, the heat generated by the transmitting coil assembly during charging can be transferred to the heat conduction stand and then further to the heat conduction housing to dissipate heat, so as to reduce the temperature of the wireless charging apparatus.

BRIEF DESCRIPTION OF THE DRAWINGS

Through the following description of the embodiments of the present invention with reference to the drawings, the above and other objectives, features and advantages of the present invention will become more apparent, wherein.

DETAILED DESCRIPTION OF EMBODIMENTS OF THE INVENTION

Several preferred embodiments of the present disclosure will be described in detail in conjunction with the accompanying drawings as follows, however, the present disclosure is intended to encompass any substitutions, modifications, equivalents, etc., made thereto without departing from the spirit and scope of the present disclosure. In order to provide those skilled in the art with thorough understanding of the present disclosure, particular details will be described below in the preferred embodiments of the present disclosure, although those skilled in the art can understand the present disclosure without the description of these details.

In addition, a person skilled in the art should understand that the drawings herein are provided for the purpose of description only, and are not necessarily drawn in proportion.

Furthermore, it should be understood that in the following descriptions, "circuit" refers to an electrical circuit formed by electrically connecting or electromagnetically connecting at least one element or sub-circuit. When one element or circuit is "connected to" another element or one element/circuit is "connected" between two nodes, the one element/circuit can be directly coupled or connected to another element or via an intermediate element, and the connection between the elements can be a physical connection, a logical connection or a combination thereof. On the contrary, when one element is "directly coupled to" or "directly connected to" another element, it means that no intermediate element is provided between the two elements.

Unless otherwise stated, the terms "comprise", "include" and the like in the specification shall be interpreted as inclusive rather than exclusive or exhaustive; in other words, the terms mean "include but not limited to".

In the descriptions of the present invention, it should be understood that the terms like "first", "second" and the like are used for the purpose of description only, but cannot be considered to indicate or imply relative importance. In addition, in the descriptions of the present invention, unless otherwise stated, the meaning of "a plurality of" is two or more.

Figure 1:
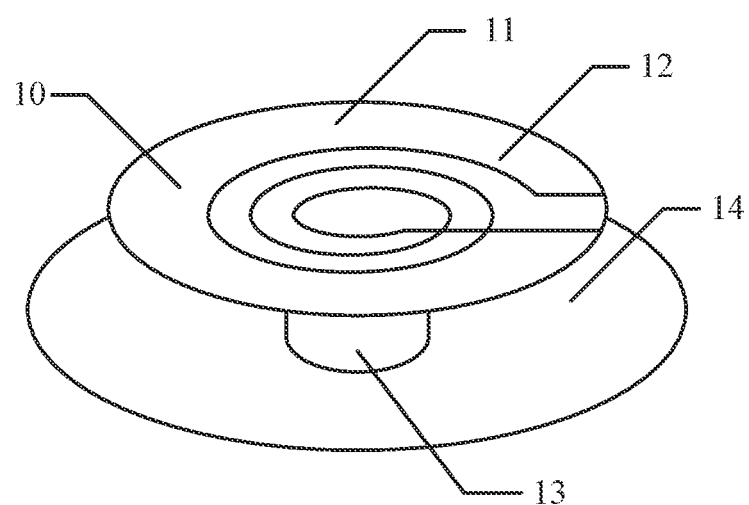
FIG. 1 is a schematic view of a wireless charging apparatus according to one optional embodiment of the present disclosure.

FIG. 1 is a schematic view of a wireless charging apparatus according to one optional embodiment of the present invention. As shown in FIG. 1, in one optional embodiment of the present disclosure, the wireless charging apparatus includes a transmitting coil assembly 10, a heat conduction stand 13, and a heat conduction housing 14, wherein the transmitting coil assembly 10 is disposed above the heat conduction stand 13, and the heat conduction stand 13 is disposed above the heat conduction housing 14. Optionally, the transmitting coil assembly 10, the heat conduction stand 13 and the heat conduction housing 14 are coaxially disposed.

In some embodiments, the transmitting coil assembly 10 includes a magnetic sheet 11 and a transmitting coil 12 fixedly put on the magnetic sheet 11. When a device mounted with a wireless receiving assembly is charged through the wireless charging apparatus of the embodiment of the present invention, the transmitting coil 12 generates a varying magnetic field in an energized state. Under the action of the varying magnetic field, a coil in the wireless receiving assembly of an external device generates an induced current, converts the induced current into electric energy, and then the external device stores the electric energy. The magnetic sheet 11 is disposed below the transmitting coil 12 and is used to guide a direction of the magnetic field generated by the transmitting coil 12, so as to enhance the magnetic field intensity of the coil. Furthermore, the magnetic sheet 11 also has the effect of preventing the magnetic field from contacting other conductors such as a metal and the like, so as to avoid the generation of eddy current. Optionally, in the transmitting coil assembly 10, the magnetic sheet 11 can be a soft magnetic sheet, a nano-crystalline magnetic sheet, an injection molding magnetic sheet and the like. The transmitting coil 12 can be a single-layer wireless charging coil, a copper-core wireless charging coil, a color code inductor, a honeycomb type wireless charging coil and the like.

The heat conduction stand 13 is disposed below the magnetic sheet 11, and is thermally conductively connected with the magnetic sheet by a closely attaching or other means. In the embodiment of the present disclosure, the heat conduction stand 13 is made from a heat conducting material such as a solid heat conducting metal, a heat conducting silica gel, a heat conducting graphite sheet and the like. During charging through the wireless charging apparatus, the heat generated by the transmitting coil assembly 10 can be received by the heat conduction stand 13 in a heat transfer manner, so as to further dissipate heat to reduce the temperature of the wireless charging apparatus. Optionally, when the heat conduction stand 13 is made from a conductor, the magnetic induction line of the magnetic field generated by the transmitting coil 12 form a closed loop at the edge of the magnetic sheet 11, if the heat conduction stand 13 is so large that the magnetic field contact the heat conduction stand 13, the eddy current would be generated, causing unnecessary loss. Therefore, the heat conduction stand 13 can be disposed in the center of the transmitting coil assembly 10 or at other position that the edge of the magnetic sheet 11 does not coincide with the heat conduction stand 13, and the overlapping area between the heat conduction stand 13 and the magnetic sheet 11 is less than the area of the magnetic sheet 11. That is, the overlapping surface between the heat conduction stand 13 and the magnetic sheet 11 is located in the center of the magnetic sheet 11, and the overlapping area is less than the area of the magnetic sheet 11. A second gap 17 is formed between the magnetic sheet 11 and the heat conduction housing 14 in a direction parallel to the magnetic sheet 11. Therefore, the closed loop of the magnetic flux of the magnetic field generated by the transmitting coil 12 cannot contact the heat conduction stand 13. Optionally, the shape of the heat conduction stand 13 can be configured to be a prismatic structure, a cylindrical structure, a truncated pyramid structure or a truncated cone structure. Further, the prismatic structure, the cylindrical structure, the truncated pyramid structure or the truncated cone structure can also be disposed according to the shape of the magnetic sheet 11. For example, when the magnetic sheet 11 is in a polygonal shape, the heat conduction stand 13 is correspondingly in a prism shape or a truncated pyramid shape; and when the magnetic sheet 11 is in a circular shape, the heat conduction stand 13 is correspondingly in a cylindrical shape or a truncated cone shape. The heat conduction stand 13 and the magnetic sheet 11 have the same central axis. In order to improve the heat transfer efficiency, namely a heat conduction effect, of the heat conduction stand 13, a heat conduction medium is disposed on the overlapping surface between the heat conduction stand 13 and the magnetic sheet 11; the heat conduction medium can be the heat conducting materials such as a heat conducting silicone grease, a heat conducting adhesive and the like.

The heat conduction housing 14 is disposed below the heat conduction stand 13; the heat conduction stand 13 is connected to the heat conduction housing 14 in a heat conduction manner, and is used to transfer the heat generated by the transmitting coil assembly 10 to the heat conduction housing 14 to dissipate heat during charging, so as to reduce the temperature of the wireless charging apparatus. Optionally, the heat conduction housing 14 and the heat conduction stand 13 are made from the same material, which can be the heat conducting materials such as a solid metal, a heat conducting silica gel and the like. In some embodiments, the heat conduction housing 14 is made from metal material.

Figure 2:
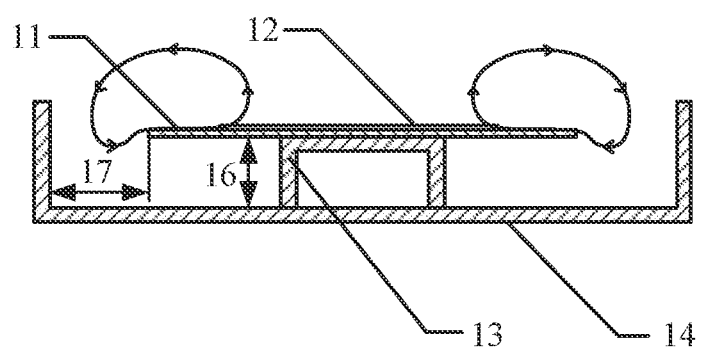
FIG. 2 is a sectional view of the wireless charging apparatus according to one optional embodiment of the present disclosure.

FIG. 2 is a sectional view of the wireless charging apparatus according to one optional embodiment of the present disclosure. As shown in FIG. 2, in one optional embodiment of the present disclosure, the transmitting coil 12 in the transmitting coil assembly 10 is disposed above the magnetic sheet 11; the heat conduction stand 13 is disposed below the magnetic sheet 11; and the heat conduction housing 14 is disposed below the heat conduction stand 13. When the device mounted with a wireless receiving assembly is charged through the wireless charging apparatus of the embodiment of the present disclosure, the transmitting coil 12 generates a varying magnetic field in an energized state, and the magnetic field is closed to form a loop at the edge of the magnetic sheet 11, wherein the heat generated by the transmitting coil assembly 10 can be received by the heat conduction stand 13 in a heat transfer manner and further transferred to the heat conduction housing 14 for heat dissipation, so as to reduce the temperature of the wireless charging apparatus. Optionally, the height of the heat conduction stand 13 is greater than 1 mm; the heat conduction stand 13 is disposed in the center of the magnetic sheet 11, therefore, a first gap 16 with a height greater than 1 mm is generated between the magnetic sheet 11 and the heat conduction housing 14, and the overlapping area between the heat conduction stand 13 and the magnetic sheet 11 is less than the magnetic sheet 11. The closed loop of the magnetic flux of the magnetic field generated by the transmitting coil 12, formed at the edge of the magnetic sheet 11, cannot contact the heat conduction stand 13 or the heat conduction housing 14.

During charging, the wireless charging apparatus of the embodiment of the disclosure can transfer the heat generated by the transmitting coil assembly, through the heat conduction stand, to the heat conduction housing for heat dissipation, so as to reduce the temperature of the wireless charging apparatus. Furthermore, the overlapping area between the heat conduction stand 13 and the magnetic sheet 11 is less than the area of the magnetic sheet 11, and a first gap 16 of a predetermined height is formed between the heat conduction housing 14 and the magnetic sheet 11. Extra loss and heat generating by the eddy current, which caused by the magnetic field of the transmitting coil assembly contacts the heat conduction stand and the heat conduction housing, can be avoid.

Figure 3:
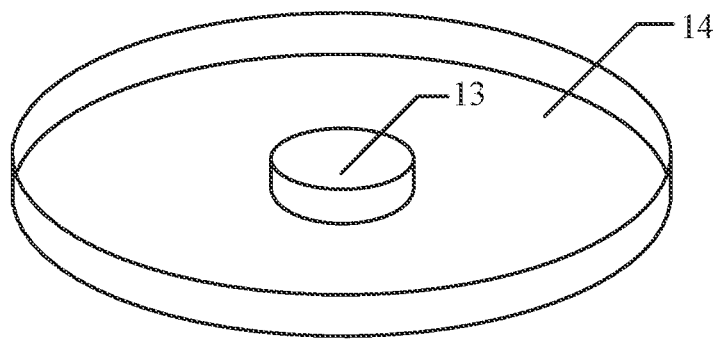
FIG. 3 is a schematic view of a heat conduction housing according to one embodiment of the present disclosure.

FIG. 3 is a schematic view of a heat conduction housing according to one embodiment of the disclosure. As shown in FIG. 3, in order to improve the heat conduction effect and save the manufacturing cost, the heat conduction stand 13 and the heat conduction housing 14 can be an integrated structure.

Figure 4:
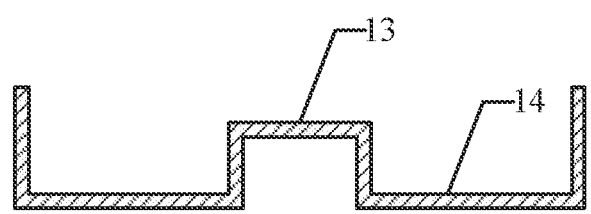
FIG. 4 is a sectional view of the heat conduction housing according to one embodiment of the present disclosure.

FIG. 4 is a sectional view of the heat conduction housing according to one embodiment of the disclosure. As shown in FIG. 4, a protrusion with a size smaller than the magnetic sheet 11 and a height greater than 1 mm can be formed on the heat conduction housing 14 by means of mechanically stamping and the like; and the protrusion is treated as the heat conduction stand 13. The transmitting coil assembly 10 is directly disposed above the protrusion of the heat conduction housing 14, such that the protrusion is located in the center of the magnetic sheet 11, and is closely attached to the magnetic sheet 11. During operation of the wireless charging apparatus, by contacting the protrusion of the heat conduction housing 14, the heats generated by the transmitting coil 12 and the magnetic sheet 11 are directly transferred to the heat conduction housing 14 for heat dissipation, thereby the heat conduction effect is improved.

Figure 5:
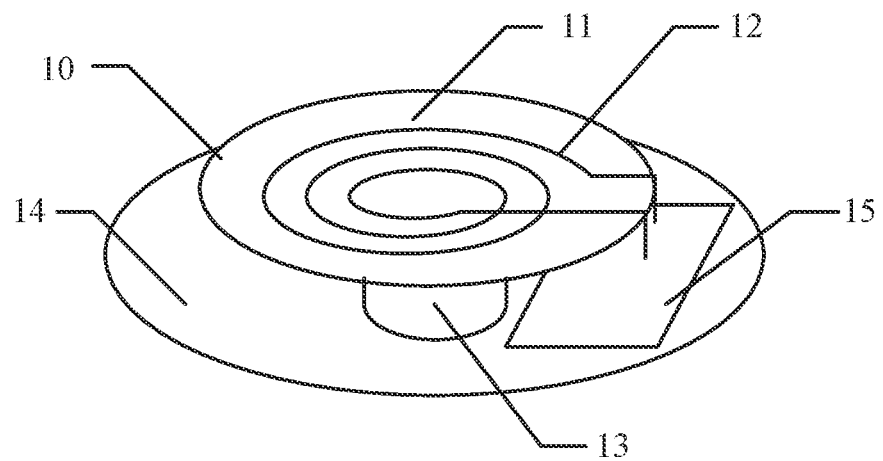
FIG. 5 is a schematic view of the wireless charging apparatus according to another optional embodiment of the present disclosure.

FIG. 5 is a schematic view of the wireless charging apparatus according to another optional embodiment of the present disclosure. As shown in FIG. 5, in another embodiment of the present disclosure, the wireless charging apparatus includes a transmitting coil assembly 10, a heat conduction stand 13, a heat conduction housing 14, and a control circuit assembly 15. The transmitting coil assembly 10 is disposed above the heat conduction stand 13, and the heat conduction stand 13 is disposed above the heat conduction housing 14. Optionally, the transmitting coil assembly 10, the heat conduction stand 13 and the heat conduction housing 14 are coaxially disposed. The control circuit assembly 15 is disposed above the heat conduction housing 14.

To be specific, the control circuit assembly 15 is a circuit board welded with a plurality of electronic devices, and is electrically connected to the transmitting coil 12 of the transmitting coil assembly 10. When the device mounted with a wireless receiving assembly is charged through the wireless charging apparatus, the control circuit assembly 15 supplies an alternating current to the transmitting coil 12, so as to control the transmitting coil 12 to generate a varying magnetic field. During charging, the transmitting coil 12, the magnetic sheet 11 and the control circuit assembly 15 all generate heat, wherein the magnetic sheet 11 is thermally conductively connected with the heat conduction stand 13, therefore, the heats generated by the transmitting coil 12 and the magnetic sheet 11 can be transferred, through the heat conduction stand 13, to the heat conduction housing to dissipate heat. The control circuit assembly 15 is closely attached to the heat conduction housing 14 in a heat conduction manner, and transfers the heat generated during charging to the heat conduction housing 14 in a heat conduction manner to dissipate heat.

Figure 6:
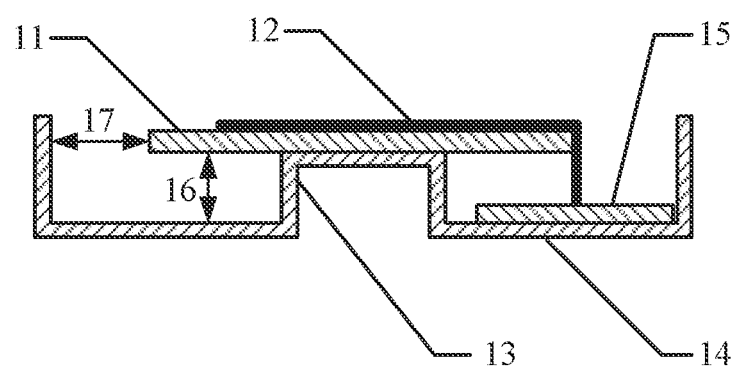
FIG. 6 is a sectional view of the wireless charging apparatus according to another optional embodiment of the present disclosure.

FIG. 6 is a sectional view of the wireless charging apparatus according to another optional embodiment of the present disclosure. As shown in FIG. 6, in another optional embodiment of the present disclosure, the transmitting coil 12 of the transmitting coil assembly 10 is disposed above the magnetic sheet 11; the heat conduction stand 13 is disposed below the magnetic sheet 11; and the heat conduction housing 14 is disposed below the heat conduction stand 13. Furthermore, the control circuit assembly 15 is disposed above the heat conduction housing 14, and is at least partially disposed below the magnetic sheet 11.

When the device mounted with a wireless receiving assembly is charged through the wireless charging apparatus of the embodiment of the present disclosure, the control circuit assembly 15 supplies an alternating current to the transmitting coil 12. The transmitting coil 12 generates a varying magnetic field under the action of the alternating current, and the magnetic flux of the magnetic field form a closed loop at the edge of the magnetic sheet 11, wherein the heat generated by the transmitting coil assembly 10 can be received by the heat conduction stand 13 in a heat conduction manner and further transferred to the heat conduction housing 14 to dissipate heat, so as to reduce the temperature of the wireless charging apparatus. The heat generated by the control circuit assembly 15 can be directly transferred to the heat conduction housing 14 in a heat conduction manner to dissipate heat, so as to reduce the temperature of the wireless charging apparatus.

Optionally, the height of the heat conduction stand 13 is greater than 1 mm; the heat conduction stand 13 is disposed in the center of the magnetic sheet 11, therefore, a first gap 16 with a height greater than 1 mm is generated between the magnetic sheet 11 and the heat conduction housing 14, and the overlapping area between the heat conduction stand 13 and the magnetic sheet 11 is less than the magnetic sheet 11. The magnetic flux of the magnetic field generated by the transmitting coil 12 form a closed loop at the edge of the magnetic sheet 11, and the magnetic field cannot contact the heat conduction stand 13 or the heat conduction housing 14. Furthermore, the heat conduction stand 13 generates a first gap 16 with a predetermined height between the magnetic sheet 11 and the heat conduction housing 14, and a second gap 17 is formed between the magnetic sheet 11 and the heat conduction housing 14 in a direction parallel to the magnetic sheet 11. Therefore, the control circuit assembly 15 can be disposed between the magnetic sheet 11 and the heat conduction housing 14, and be closely attached to the heat conduction housing 14, thereby having the effects of saving space and reducing the volume of the wireless charging apparatus.

The wireless charging apparatus of the embodiment of the present disclosure can transfer, through the heat conduction stand, the heat generated by the transmitting coil assembly during charging to the heat conduction housing to dissipate heat, and can transfer the heat generated by the control circuit assembly directly to the heat conduction housing in a heat conduction manner to dissipate heat, so as to reduce the temperature of the wireless charging apparatus. The overlapping surface between the heat conduction stand and the magnetic sheet is less than the area of the magnetic sheet, and a first gap with a predetermined height is formed between the heat conduction housing and the magnetic sheet; therefore, the control circuit assembly can be disposed in the heat conduction housing, thereby avoiding generating extra loss and heat due to the eddy current effect generated when the magnetic field generated by the transmitting coil assembly contacts the heat conduction stand and the heat conduction housing, and having the effects of saving space and reducing the overall volume of the wireless charging apparatus.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is intended that the scope of the present disclosure be defined by the claims appended hereto and their equivalents.

We claim:

1. A wireless charging apparatus, comprising:
 a transmitting coil assembly, comprising:
   a magnetic sheet; and
   a transmitting coil, put on the magnetic sheet;
 a heat conduction stand, configured to place the transmitting coil assembly, wherein the heat conduction stand is thermally conductively connected to the magnetic sheet and having an overlapping area with the magnetic sheet less than an area of the magnetic sheet;
 a heat conduction housing, connected to the heat conduction stand, and configured to receive the heat, generated by the transmitting coil, through the heat conduction stand; and
 a control circuit assembly, electrically connected to the transmitting coil;
 wherein a first gap is formed, in a direction perpendicular to the magnetic sheet, between the magnetic sheet and the heat conduction stand, and the control circuit assembly is disposed in the first gap.

2. The apparatus of claim 1, wherein the heat conduction stand and the heat conduction housing are of an integrated structure.

3. The apparatus of claim 2, wherein the heat conduction stand and the heat conduction housing are formed by mechanically stamping, and the heat conduction stand is protruding from the heat conduction housing.

4. The apparatus of claim 1, further comprising:
 a heat conduction medium, disposed between the heat conduction stand and the magnetic sheet.

5. The apparatus of claim 1, wherein the shape of the heat conduction stand is configured to be a prism, a cylinder, a truncated pyramid or a truncated cone.

6. The apparatus of claim 1, wherein the control circuit assembly is thermally conductively connected to the heat conduction housing.

7. The apparatus of claim 6, wherein the control circuit assembly is at least partially disposed between the transmitting coil assembly and the heat conduction housing.

8. The apparatus of claim 1, wherein the height of the heat conduction stand is greater than 1 mm.

9. The apparatus of claim 1, wherein the transmitting coil assembly, the heat conduction stand and the heat conduction housing are disposed coaxially.

10. The apparatus of claim 1, wherein the magnetic sheet and the heat conduction stand are disposed coaxially.

11. The apparatus of claim 1, wherein the magnetic sheet is disposed between the transmitting coil and the heat conduction stand.

12. The apparatus of claim 1, wherein the heat conduction stand is disposed between the transmitting coil assembly and the heat conduction housing.

13. The apparatus of claim 1, wherein the edge of the magnetic sheet and the heat conduction stand are non-overlapping.

14. The apparatus of claim 1, wherein the heat conduction housing is at least partially disposed below the heat conduction stand.

15. The apparatus of claim 1, wherein the heat conduction stand and/or the heat conduction housing are made from metal material.

16. The apparatus of claim 1, wherein a second gap is formed, in a direction parallel to the magnetic sheet, between the magnetic sheet and the heat conduction housing.

17. The apparatus of claim 1, wherein the magnetic sheet is closely adhered to the heat conduction stand.

* * * * *